United States Patent [19]

Walls

[11] 4,040,513
[45] Aug. 9, 1977

[54] DISC ADVANCING AND METERING DEVICE

[75] Inventor: Leroy C. Walls, Valparaiso, Ind.

[73] Assignee: Lewals, Inc., Chesterton, Ind.

[21] Appl. No.: 533,184

[22] Filed: Dec. 16, 1974

Related U.S. Application Data

[62] Division of Ser. No. 308,145, Nov. 20, 1972, Pat. No. 3,886,892.

[51] Int. Cl.² .......................... B65B 7/28; B67B 3/08
[52] U.S. Cl. .................................... 198/530; 53/316; 198/786; 221/222
[58] Field of Search .................. 198/127 R, 211, 22 R, 198/122, 26, 530, 563, 786; 53/316; 221/222

[56] References Cited

U.S. PATENT DOCUMENTS

| | | | |
|---|---|---|---|
| 1,604,133 | 10/1926 | Rebechini | 198/127 R |
| 1,652,419 | 12/1927 | Shields | 198/211 |
| 2,579,737 | 12/1951 | Giordano | 53/316 X |
| 2,597,930 | 5/1952 | Grosvenor | 198/127 R |
| 2,916,125 | 12/1959 | Wallberg | 198/26 X |
| 3,137,982 | 6/1964 | Decker et al. | 53/316 |
| 3,332,210 | 7/1967 | Tordi | 53/316 |
| 3,350,842 | 12/1967 | Renish | 53/316 |
| 3,417,859 | 12/1968 | Clemente | 198/122 |
| 3,451,527 | 6/1969 | Leach | 198/127 R |
| 3,495,252 | 2/1970 | Hamlin | 53/316 X |
| 3,526,208 | 9/1970 | Solomin | 118/73 |

*Primary Examiner*—Evon C. Blunk
*Assistant Examiner*—Douglas D. Watts
*Attorney, Agent, or Firm*—Wegner, Stellman, McCord, Wiles & Wood

[57] ABSTRACT

A disc advancing and painting apparatus including a pair of generally cylindrical support rollers rotatably mounted in adjacent side-by-side relationship to provide a cradle for supporting a row of similar discs or the like on edge in adjacent relationship, means for rotating the support rollers in the same angular direction to spin the discs, means for advancing the row from an entrance end of the rollers to the opposite discharge end of the rollers, means for holding the discs on the support rollers during advance from the entrance end toward the discharge end, yieldable gate means at the discharge end of the rollers mounted for movement between a blocking position obstructing discharge of the end disc and a retracted position for discharge of the end disc, and a paint gun disposed adjacent the discharge end of the support rollers for momentarily directing paint against the spinning end disc while the latter is held against discharge by the gate means.

3 Claims, 10 Drawing Figures

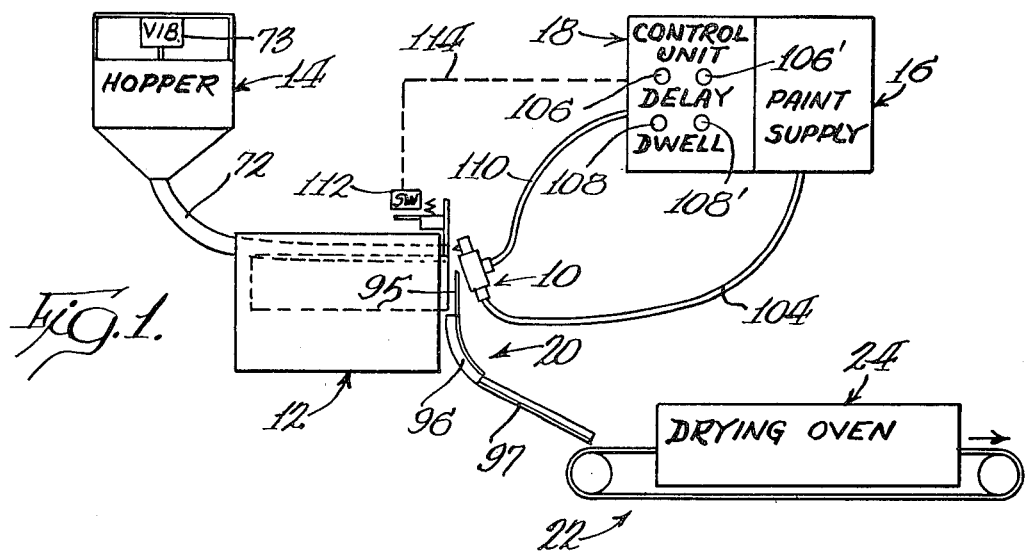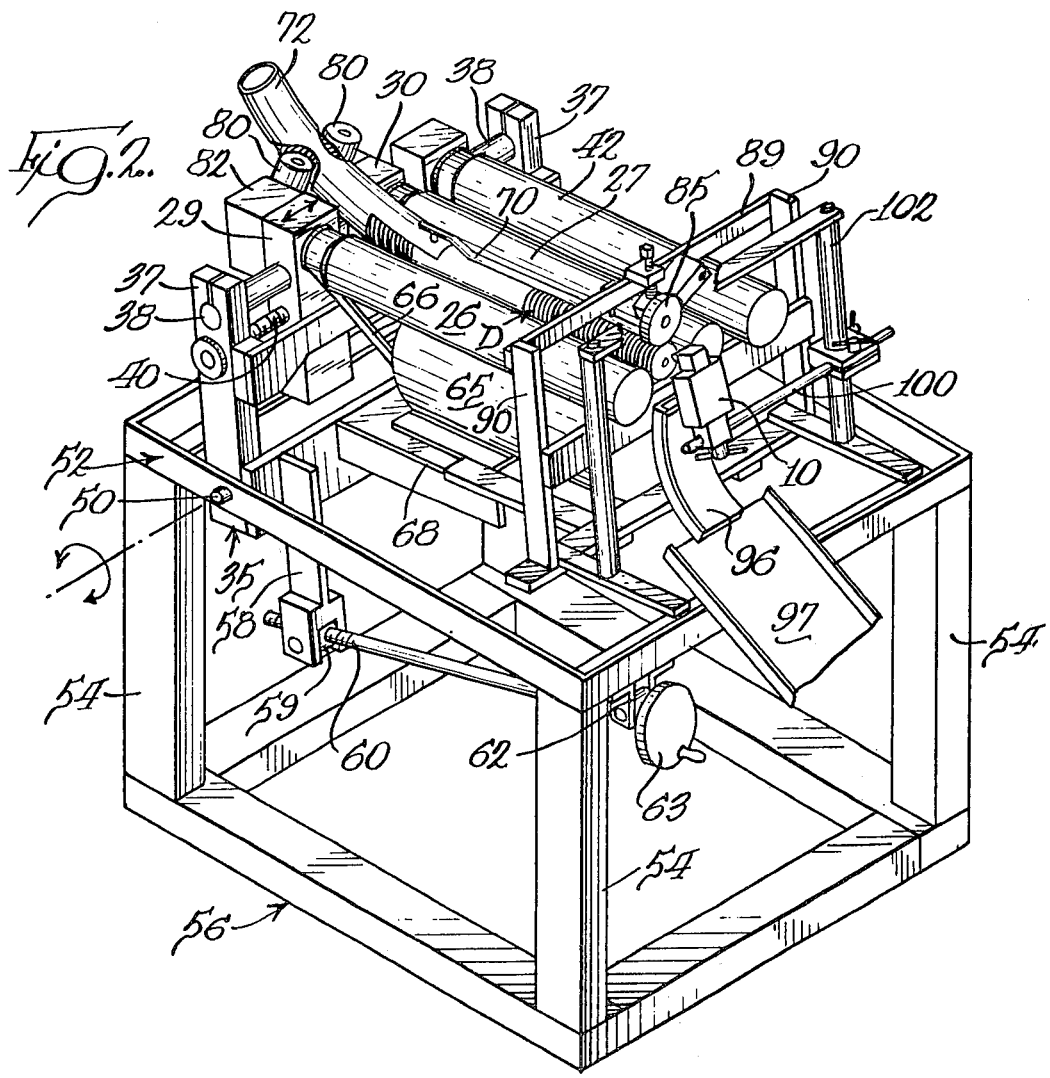

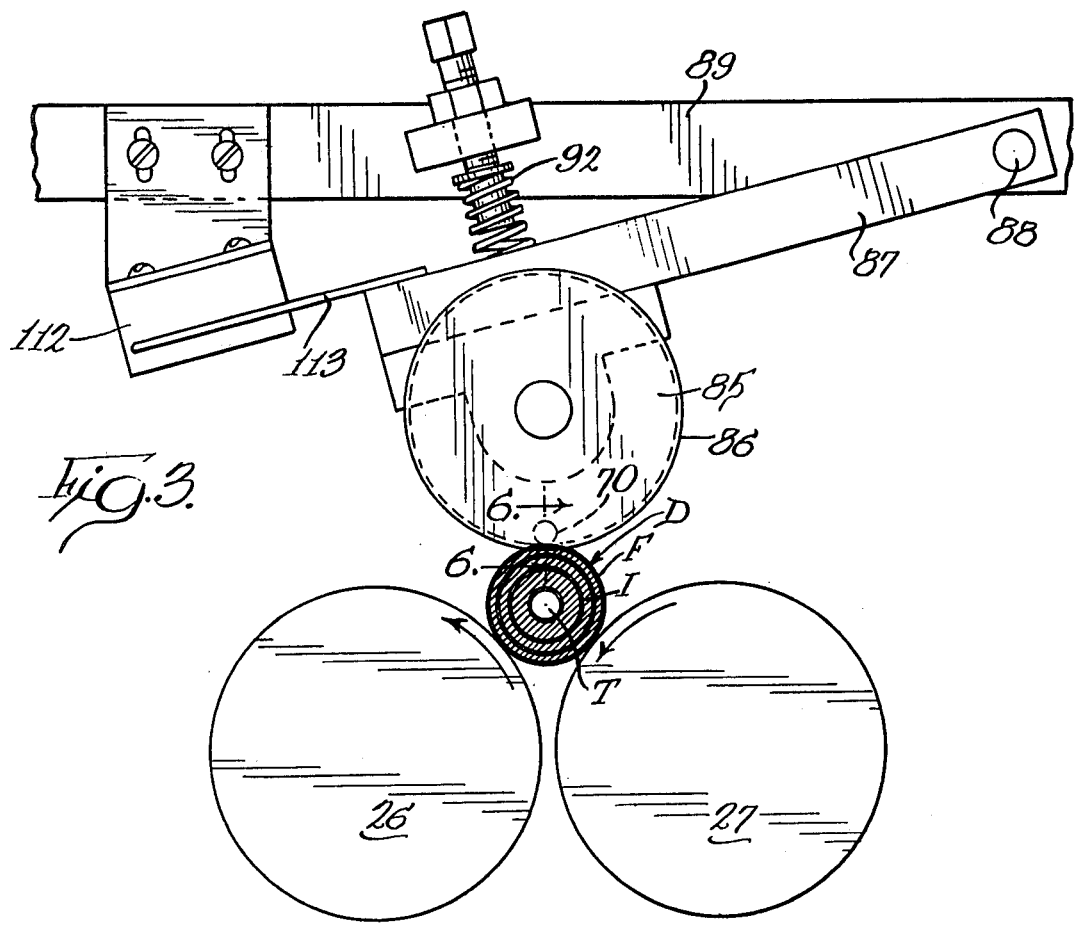

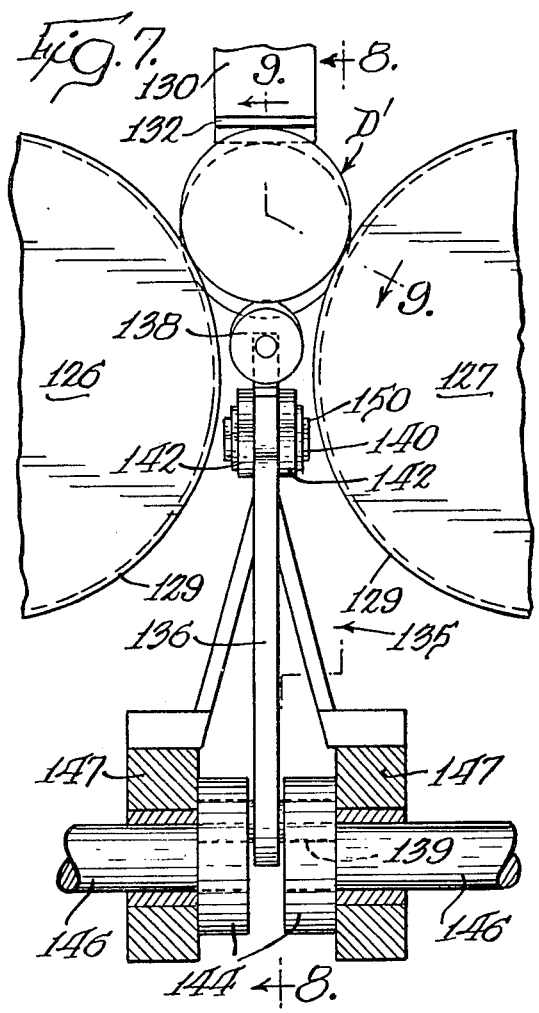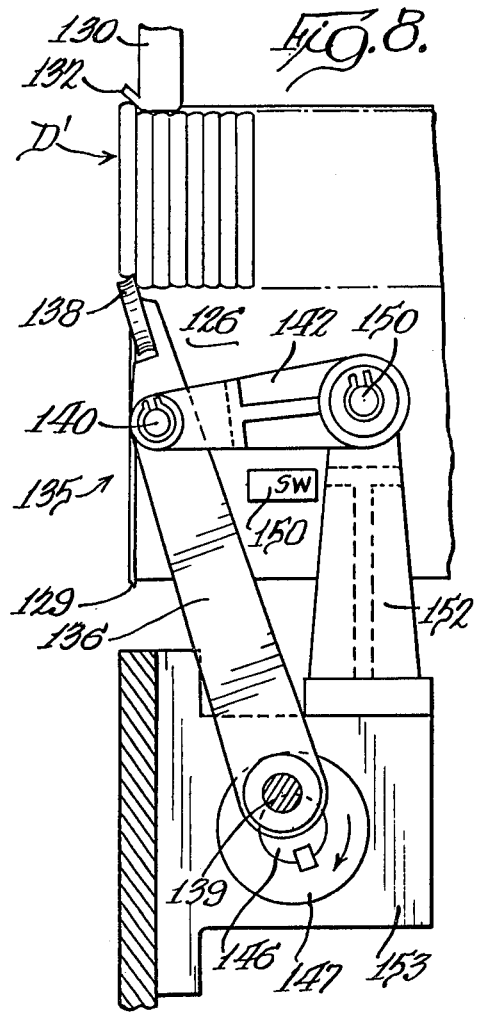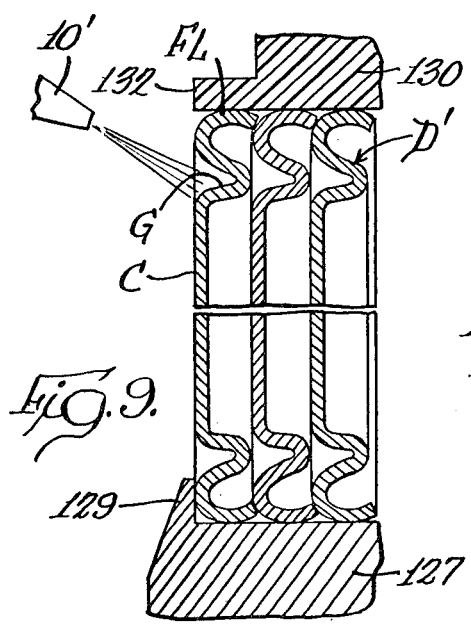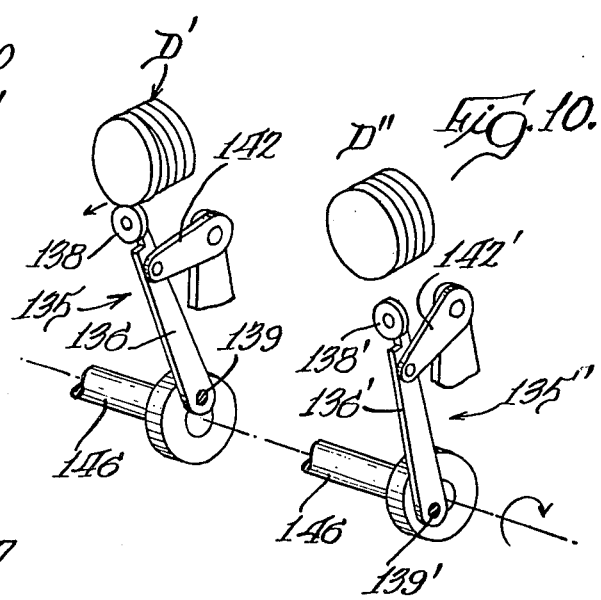

DISC ADVANCING AND METERING DEVICE

This is a division of application Ser. No. 308,145 filed Nov. 20, 1972, now U.S. Pat. No. 3,886,892.

BACKGROUND OF THE INVENTION

The present invention relates to a disc advancing and painting apparatus for coating surfaces of circular discs such as end closures for cylindrical containers of various types. The apparatus includes means for supporting a row of circular discs on edge in adjacent relationship and at the same time spinning the discs and advancing the row in a longitudinal direction toward a paint station where a paint gun directs paint against the spinning end disc.

The invention was developed to provide a high speed painting apparatus for coating circular discs at an accelerated rate in excess of 300 discs per minute.

SUMMARY OF THE PRESENT INVENTION

It is a general object of the invention to provide a new and improved high speed apparatus for applying paint or other coating material to discs such as can ends.

Another object is to provide a new and improved disc advancing mechanism for feeding a plurality of similar circular discs on edge in adjacent relationship in a generally cylindrically shaped row toward a paint station.

A more specific object is to provide a disc advancing and painting apparatus including means for supporting a row of discs on edge in adjacent relationship and at the same time spinning the discs and advancing the row in a longitudinal direction toward a paint station where a paint gun directs a momentary jet of paint against the spinning end disc in the row, following which the painted disc is discharged from the supporting means for drying.

In a preferred embodiment, the disc advancing mechanism comprises a pair of generally cylindrical support rollers rotatably mounted in adjacent side-by-side relationship to provide a cradle for supporting a row of discs, means for rotating the rollers in the same angular direction as the discs advance from one end of the rollers to the other, a rod disposed over the cradle for holding the discs on the support rollers, and gate means at the discharge end of the support rollers movable between a blocking position obstructing discharge of the end disc and a retracted position permitting discharge of the end disc.

If desired, the disc advancing mechanism may be mounted on a pivotable frame adjustable for purposes of inclining the support rollers either upwardly or downwardly from the entrance end toward the discharge end.

In one form of the invention, the gate means at the discharge end of the support rollers comprises a yieldably mounted pressure roller engaging several discs at the discharge end and having an enlarged peripheral flange which momentarily retards the discharge of the end disc before yielding to permit the end disc to drop off the support rollers. In another form the support rollers are flanged, and a pressure foot has a yieldable portion responsive to a pusher.

As illustrated herein, the discs are guided toward the entrance end of the cradle between the support rollers by means of a tubular guide extending downwardly from a hopper supply of discs and laterally toward the entrance end of the rollers such that the weight of the discs in the guide contributes to the advance of the discs along the guide. In order to provide a variable positive feed of the discs toward the support rollers, a pair of feed rollers may be disposed at opposite sides of the guide with surfaces of the rollers engaging opposite sides of the row of discs, together with means for rotating the feed rollers in a direction to advance the discs along the guide.

The paint apparatus includes a paint gun disposed adjacent the discharge end of the support rollers for momentarily directing a jet of paint against the spinning end disc while the latter is held against discharge by the gate means, and control means responsive to the movement of the gate means energizes the paint gun.

Preferably, the control means for the paint gun comprises a switch actuated by movement of a pivoted roller at the discharge gate, and a control responsive to the switch for energizing the paint gun. In the construction illustrated herein, the control includes delay means for establishing a paint jet at a predetermined time after discharge of the end disc, and dwell means controlling the duration of the paint job before the next spinning end disc is discharged.

While reference is made to handling of discs of relatively thin dimensions, it should be understood that the invention is also usable with cylinders of relatively short length, which could be handled similarly.

BRIEF DESCRIPTION OF THE DRAWINGS

FIG. 1 is an over-all view of a disc feeding and painting apparatus embodying the principles of the present invention including a disc supply hopper, disc feeding mechanism, paint spray gun, control for the gun, and a drying oven for painted discs;

FIG. 2 is a perspective view of the mechanism for advancing discs to the paint spray gun;

FIG. 3 is a fragmentary enlarged end elevational view showing the disc support rollers and a yieldable pressure roller at the discharge end of the support rollers;

FIG. 4 is a fragmentary top plan view of the disc support rollers at the discharge end, together with the pressure roller;

FIG. 5 is a vertical sectional view taken at about the line 5—5 of FIG. 4;

FIG. 6 is a vertical sectional view taken at about the line 6—6 of FIG. 3;

FIG. 7 is an end elevation of another embodiment, partly in section, viewing the gate means at the discharge end of the support rollers;

FIG. 8 is a vertical sectional view taken at about the line 8—8 of FIG. 7;

FIG. 9 is an enlarged fragmentary sectional view taken at about the line 9—9 of FIG. 7; and FIG. 10 is a diagrammatic illustration of a drive including a plurality of disc pushers of the type shown in FIGS. 7 and 8.

DETAILED DESCRIPTION OF PREFERRED EMBODIMENTS

Referring to the drawings in more detail, and particularly FIG. 1, a paint spray gun 10 is located adjacent the discharge end of a disc advancing mechanism 12 to which discs are supplied from a source such as a hopper 14. The paint spray gun 10 is supplied with paint from a supply source 16, and operation of the paint spray gun is controlled by a control unit 18 so that paint is applied to the end disc in a row of discs supported in the advancing mechanism 12. Painted discs fall into a guide means 20 for directing the discs onto a conveyor belt 22 which carries the discs through an oven 24 for drying the paint.

The discs to be painted are present to a paint station adjacent the paint spray gun 10. The discs progress toward the paint station in a generally horizontally disposed row of generally cylindrical configuration in which the discs are disposed on edge side by side in an elongate cradle formed between a pair of cylindrically shaped support rollers 26 and 27 disposed in adjacent side-by-side parallel relationship. As best seen in FIG. 2, the support rollers 26 and 27 are rotatably mounted at one end in bearing supports 29 and 30, and extend in cantilever fashion from the bearing supports, with the opposite ends of the rollers unmounted so as to provide freedom for painting and discharge of the discs adjacent the paint spray gun 10.

The bearing supports 29 and 30 are mounted on a frame generally designated 35 including a pair of parallel upright arms 37 carrying a cross rod 38 on which the bearing supports 29 and 30 are slidably mounted for movement toward and away from each other to adjust the spacing between the rollers 26 and 27. Adjustment of the bearing supports 29 and 30 may be effected by means such as a screw threaded shaft 40 mounted in the upright arms 37 and the threadably engaging the supports 29 and 30. If desired, a single screw shaft 40 may have oppositely threaded portions for simultaneously moving the bearing supports 29 and 30 toward or away from each other. If it is desirable to increase the capacity of the apparatus, by utilizing a second paint gun for painting discs in a second supply row, an additional support roller may be provided as at 42, mounted and driven in a manner similar to that described in connection with support rollers 26 and 27, to provide a second cradle with the roller 27.

As illustrated herein, the frame 35 is pivotally mounted as at 50 for adjustment about a horizontal axis relative to a chassis 52 supported by upright columns 54 on a base 56. In order to adjust the frame 35 about the axis of the pivotal mounting 50, the frame includes a depending bracket 58 carrying a pivoted nut 59 on a threadably adjustable screw shaft 60. The shaft 60 is rotatably mounted and axially restrained in a bracket 62 depending from the chassis 52. A hand wheel 63 is secured on the free end of the shaft 60 so that the shaft may be manually rotated to swing the frame 35 about the pivot axis 50 for purposes of adjusting the support rollers 26 and 27 between a horizontal disposition and inclined positions extending angularly upwardly or downwardly from the entrance end of the support rollers to the discharge end of the rollers. As will appear more clearly hereinafter, it may be desirable to incline the rollers 26 and 27 either upwardly or downwardly for purposes of controlling the rate of feed of the discs along the rollers. In a typical construction, the range of adjustment may provide for tilting the rollers several degrees in either direction from horizontal. Such as adjustment is particularly useful in installations where no provision is made for positive disc feed additional to the rollers 26 and 27.

In order to spin the discs in the cradle between the support rollers 26 and 27 during advance toward the paint station, the rollers 26 and 27 are driven in the same angular direction, counterclockwise as viewed in FIG. 3. As illustrated herein, the rollers 26 and 27 are driven by a motor 65 and a driven belt 66. The drive motor 65 is supported on a platform 68 which is a part of the frame 35. The rotation of the rollers 26 and 27 in the same direction has the effect of rotating the discs in the cradle about the longitudinal axis of the row of discs so that each disc is spinning at the discharge end of the support rollers where the paint gun 10 is located. In this manner, it is possible to direct a jet or spray of paint or other coating material toward a limited portion of the spinning disc at one side of the axis thereof, and continue the jet for at least one revolution of the spinning disc, so that paint is applied in a complete circle or band.

The rollers 26 and 27 have a size and location which aid in maintaining each spinning disc in an upright plane transverse to the rollers. If the rollers are too close together, the disc tend to fall over, and if the rollers are spaced too widely, the discs tend to fall between the rollers. As shown in FIG. 3, the adjacent surfaces of the support rollers 26 and 27 are spaced apart less than the radius of the discs to be handled. At the same time, it is generally desirable for the centers of the support rollers to fall on radii emanating from the center of the row of discs at an included angle on the order of 90° to 120°, which increases as the size of the discs increases. As seen in FIG. 3, the radius of each of the support rollers 26 and 27 is approximately on the order of the diameter of the discs, but the rollers may be used with discs of larger diameter. As best illustrated in FIGS. 3, 5 and 6, the discs D are similar, and each includes an axially extending outer peripheral flange F with an outer edge lying in a plane, an annular intermediate portion I, and a central raised tip portion T, such that the center of gravity of each disc lies forward, in the direction of travel, of the plane of the outer peripheral edge of the disc. In operation, rotation of the support rollers 26 and 27 has the effect of spinning the discs D, and the spinning discs progress axially along the support rollers. The progress of the discs axially along the support rollers is believed to be due to a gyro phenomenon sometimes called precession. According to such phenomenon, if a spinning body, such as a spinning disc D, has a force applied tending to tip the disc about a horizontal axis tranverse to the spinning axis, the effect is manifested as a tendency of the spinning body to tilt about a vertical axis transverse to the horizontal axis. Thus, with the discs spinning, and the center of gravity of each disc located forwardly of the peripheral edge contacting the support rollers, the tendency of the discs to fall forward results in a slight inclination about an upright axis which provides a component of movement longitudinally along the support rollers 26 and 27.

The discs D are held in the cradle against the support rollers 26 and 27 by an overlying elongate rod as at 70 appropriately supported to engage the upper edge of the row of discs extending along a substantial portion of the length of the rollers 26 and 27. The action of the rotating rollers 26 and 27 and the restraining effect of the holddown rod 70 result in longitudinal progress of the discs along the rollers 26 and 27 toward the paint gun 10. It will be understood that the progress of the discs may be varied by inclining the rollers 26 and 27 upwardly or downwardly from horizontal. If the rollers are inclined upwardly from the inlet end toward the discharge end, the progress of the discs would be somewhat retarded, whereas if the rollers are inclined downwardly from the inlet end to the discharge end, the progress of the discs would be aided.

The discs are supplied to the cradle between the support rollers 26 and 27 by a tubular guide 72 which extends downwardly and laterally from the bottom outlet end of hopper 14. The hopper 14 may be constructed in a conventional manner to include a vibrator as seen at 73 and appropriate mechanism for orienting the discs so that all are turned in the same direction upon entering the guide tube 72, that is, so that all of the discs are turned with the outstanding central portion T projecting forwardly. It should be understood that the weight of the column of discs in the tubular guide 72 provides a force tending to move the discs downwardly through the tube 72 and longitudinally along the support rollers 26 and 27.

It it is desired to provide a more positive feed of the discs along the support rollers 26 and 27 and a capacity for wide variation in the rate of feed, compared to that normally provided by gravity and the gyro effect, the inclination of the support rollers and the weight of the discs, positive feed rollers may be utilized as illustrated at 80, engaging opposite sides of the row of discs through apertures in the tubular guide 72. The feed rollers 80 may be appropriately driven through a gear box illustrated at 82, and rotated in a direction such that the surfaces of the rollers engaging the edges of the discs advance the discs positively toward the paint gun 10.

In order to control the discharge of the discs at the end of the support rollers 26 and 27 adjacent the paint gun 10, a pressure roller 85 is positioned to yieldably engage the top of the last several discs in the row, three discs as illustrated in FIGS. 4, 5 and 6. The pressure roller includes an outwardly extending peripheral end flange 86 normally positioned in the path of the discs to retard the progress of the discs. As shown in FIGS. 2 and 3, the pressure roller 85 is rotatably mounted on an arm 87 pivoted at 88 on a crosspiece 89 extending between upright 90 on the frame 35. The pivoted arm 87 is yieldably biased by an adjustable spring 92 toward the posiion illustrated in FIG. 6 where the periphery of the roller 85 engages the outer peripheral edges of several spinning discs D and the flange 86 on the pressure roller retards the progress of the discs along the support rollers 26 and 27. However, the flange 86 cannot indefinitely resist the feeding effect of the rollers 80 acting against the row of discs, and after a short delay, the end disc forces the pressure roller upwardly to a retracted position where such disc is permitted to progress past the flange 86. In order to facilitate discharge of the released disc, it should be noted that the support roller 26 is slightly shorter than the support roller 27 by an amount corresponding approximately to the thickness of one disc. Thus, on viewing FIGS. 3 and 4, it will be understood that after the end disc is released by the flange 86, the disc progresses past the end of the support roller 26 and falls laterally and downwardly past the end of the roller 26 toward the guide means 20.

It will be appreciated that in an installation where the positive feed rollers 80 are utilized, less reliance is placed upon the weight of the stack in the guide 72, on the inclination of the support rollers 26 and 27, and on the gyro effect of the spinning discs, and instead the discs are positively advanced at a rate which may be varied if desired. At the same time, the gate roller or pressure roller 85 momentarilly holds the end disc against longitudinal progress for the painting operation, while the disc is still spinning, following which it is released. It should be understood that while the discs are essentially in close engaging relationship, there may be some space between some adjacent discs, and some accordion action in the progress of the row which permits the momentary detention of the last disc in spite of the feeding effect applied to the row of discs.

Immediately following the painting operation, the painted end disc falls downwardly and laterally past the end of the shorter support roller 26 toward the guide means 20. As best seen in FIGS. 1 and 2, the guide means includes a guard or plate as at 95 disposed adjacent the ends of the support rollers 26 and 27, and particularly 26, for purposes or restraining the released painted disc against significant further motion longitudinally of the support rollers. The guard 95 directs the released disc into a closed flat chute 96 which extends downwardly from the guard 95 and is curved laterally to deposit the discs in a wider open inclined tray 97 leading to the conveyor belt 22. The discs slide down the chute 96 and the tray 97 at a rapid rate and are deposited in random positions on the conveyor belt 22 in order to be carried through the heated drying oven 24 where the moisture in the paint is evaporated so that the discs are substantially dry when dropped from the conveyor belt 22.

The spray gun 10 may be a conventional commercially available Nordson Airless Spray Gun made by Nordson Corporation of Amherst, Ohio. The gun 10 is adjustably mounted on a transverse rod 100 in turn adjustably mounted on an upright post 102 on the frame 35. The gun is supplied with paint through a tube 104 extending from the paint supply 16 which includes a pump which may be a conventional commercially available pump of the type marketed by Nordson Corporation as Model 64. The pump functions to draw paint from an appropriate source and supply the paint under pressure through the hose 104 to the gun 10.

The gun 10 is constructed with an appropriate nozzle for directing a jet or spray of paint in an adjustable pattern toward the end discs at the discharge station on the support rollers 26 and 27. While the nozzle is adjustable to some extent to control the pattern of paint discharged, if desired, the guard 95 or a similar plate may be formed with an aperture and surrounding guard portions for controlling the pattern of the paint spray directed onto the disc at the paint station. The flow of paint from the pressure conduit 104 to the discharge nozzle is controlled by appropriate valve means which may be opened selectively and closed after a predetermined time period in which the spinning disc may complete at least one revolution so as to be coated as desired. It will be appreciated that the entire end of the disc may be painted or otherwise coated, or only a limited annular portion may be coated while an outer edge or central portion may be left uncoated, depending upon the pattern of the spray directed toward the disc.

The valve means in the spray gun 10 is controlled by a standard commercially available control unit 18 of a type manufactured by Nordson and described as Model C2. Among other features, such control unit includes a triggering means for actuating the spray gun and including a manually adjustable knob 106 permitting variation in a delay period before the gun is actuated following an input control signal. The control unit also includes a manually adjustable knob 108 for varying the dwell periods during which the paint spray valve is held open. Control signals are provided from the control unit 18 to the valve means in the gun 10 through a cable 110. In order to provide an appropriate input signal to the control unit 18, a switch 112 is mounted adjacent the pressure roller 85 and includes a switch actuating lever 113 engageable by the pivoted arm 87 carrying the pressure roller. In this manner, the switch 112 is actuated when the pressure roller 85 is forced upwardly to permit passage of the end disc following application of paint to such disc. The switch 112 provides a signal to the control unit 18 through a cable 114. Then, following the delay determined by the setting of the knob 106, the spray gun is energized and maintained energized for a predetermined period of time determined by the adjustment of the manually accessible knob 108. In a typical installation, the delay period before actuation of the spray gun, following the input signal, may be on the order of several milliseconds, and the dwell period determining the duration of the paint spray may be on the order of several milliseconds.

In operation of the apparatus as described, the discs are painted at an extremely high rate of speed in excess of 300 discs per minute. At this rate, it will be understood that the discs are rotating very rapidly and required only a momentary spray of paint or other coating material, and will be discharged one at a time in rapid fire order at the rate of five or more per second. The paint is applied evenly in minimum quantities required for the intended purposes. The paint is applied only to the intended areas without the problem of spreading to other areas, and the painted or otherwise coated discs are rapidly conveyed through the drying oven for discharged in large quantities for economic production.

EMBODIMENT OF FIGS. 7-10

Referring now to FIGS. 7-10, discs D' have a somewhat different configuration from the discs D previously described, and include an outer peripheral flange FL, an adjacent annular groove G and a central circular portion C. Such discs are utilized to close the end of a cylindrical container in an arrangement where the groove G is fitted over the annular end of the cylinder. In order to retain the discs on the end of the cylinder, and provide a fluidtight seal, the interior of the annular groove G is coated with an appropriate sealant material sprayed from gun 10' while the row of discs is rotated according to the principles previously described.

With some discs constructions, it has been found that there is sometimes a tendency for adjacent discs to stick together either because of a nesting relationship or because of suction, as a result of which the disc at the end of the row may not readily separate from the adjacent disc after painting or coating. In such situations, it is desirable to utilized a pusher at the discharge station for positively separating the end disc, rather than rely on such disc to fall away solely under the influence of gravity. as illustrated herein a pusher is utilized in conjunction with a pair of adjacent support rollers 126 and 127 provided in lieu of the support rollers illustrated at 26 and 27 in the construction previously described. Each of the support rollers 126 and 127 is formed at the end adjacent the spray gun 10' with an enlarged annular flange as at 129 which functions to retard the progress of the discs D' along the support rollers 126 and 127, and hold the end disc in position for coating of the groove G by the gun 10'. Adjacent the end flanges 129, several discs D' at the end of the cylindrical row of discs are held on the support rollers by a retaining member or a gate member in the form of a stationary body 130 having a yieldable flange 132 disposed above the end disc engaging the roller flanges 129.

The gate member 130 and the yieldable flange 132 function together with the roller flanges 129 to yieldably retain the end disc in position on the support rollers during the application of coating material to the groove G, but the flange 132 is resiliently yieldable in a manner to enable the end discs in a row to be pushed upwardly for discharge after the coating operation. In order to remove the end disc after the coating operation, a pushing mechanism 135 includes a pusher arm 136 having a rotatably mounted pusher roller 138 at the upper end adapted to engage the end disc D' and push such disc upwardly above the level of the roller flanges 129 and past the yieldable retaining flange 132. The pusher arm 136 includes a lower end portion pivotally mounted on an eccentric pin 139, and an intermediate portion pivotally connected at 140 to a pivoted lever 142. The eccentric pin 139 and the lever 142 mount and actuate the pusher arm 136 in a manner to move the pusher roller 138 upwardly in an inclinded path extending generally lengthwise of the arm 136 to the position illustrated in FIG. 8 where the end disc is dislodged for discharge. Following discharge of the end disc, the pusher roller 138 is retracted along a more vertical path before moving upwardly again.

In order to appropriately move the pusher arm 136, the crank pin 139 is carried by a pair of spaced discs 144 respectively on adjacent ends of aligned shaft sections 146 which are driven by means not illustrated to continuously rotate in a clockwise direction as illustrated in FIG. 8. The shafts 146 are mounted in appropriate bearings as illustrated at 147, and the lower end of the pusher arm 136 is positioned between the adjacent discs 144. The pivoted lever 142 has an end remote from the pusher arm 136 pivotally mounted as at 150 on the upper end of appropriate standard means 152 supported on a frame 153. As seen in FIG. 7, two pivoted levers 142 are provided at opposite sides of the pusher arm 136 in order to more precisely regulate the motion of the pusher arm.

In operation, during rotation of the crank pin 139 in a clockwise direction as viewed in FIG. 8, pusher arm 136 moves upwardly during motion of the crank pin 139 from its lower position to its upper position. During such motion, the pivoted levers 142 swing about the mounting 150, and the pusher arm 136 is free to pivot about the connection 140. Thus, the pusher roller 138 moves upwardly and toward the left as viewed in FIG. 8 in manner which not only lifts the end disc past the roller flanges 129 and the yieldable gate flange 132, but also tends to move the end disc away from the adjacent disc to separate the end disc from the row. When the end disc is positively separated from the row in the manner described, it may be unnecessary to utilize positive feed means such as that described at 80 in the embodiment of FIGS. 1-6.

In order to control the spray gun 10' associated with the row of discs D', a control switch may be utilized as at 150 (FIG. 8) adjacent the pivoted lever 144 to be actuated by the lever on downward travel when the pusher is withdrawing after discharge of the end disc. The switch 150 may be connected to function as the switch 112 in the previously described embodiment. In particular, the switch initiates a delay period set by a manually adjustable knob 106, following which the gun 10' is energized for a predetermined period of the time determined by the setting of manual knob 108.

Referring now to FIG. 10, in situations where it is desirable to increase output by simultaneously advancing two adjacent rows of discs as at D' and D" toward two separate spray guns, a second pusher mechanism, identified by prime numbers, may be driven from the same shaft construction 146 in timed relationship to discharge a disc D" a predetermined time after discharge of a disc D' so that the spray guns may be sequentially operated rather than simultaneously placing demands on a single paint supply such as that illustrated at 16 in FIG. 1. As shown in FIG. 10, the eccentric pin 139' is connected to the drive shaft in a lagging relationship approximately 90° out of phase behind pin 139.

With the arrangement illustrated in FIG. 10, it is unnecessary for the lever 142' to actuate a second control switch. Instead, the control unit 18 is adapted to function in a manner to initiate operation of a second spray gun at a predetermined period of time following operation of the first spray gun, as determined by setting of a manual knob 106' (FIG. 1). After the predetermined delay, corresponding to the lag of eccentric pin 139' behind pin 139, the second spray gun is energized for a predetermined period of time determined by the setting of a manual knob 108' in FIG. 1. Obviously, if desired, there could be more than two rows of discs and associated pushers all operated from a single drive shaft.

In operation, the apparatus is adapted to function at a high speed to coat the grooves G in the discs in one row at a rate in excess of 300 per minute. The discs rotate rapidly and require only a momentary spray of paint to coat the entire annular length of the groove due to the high speed rotation.

I claim:

1. A feeding mechanism for feeding a row of similar discs on edge in parallel relationship wherein each disc has a circular peripheral edge and a center of gravity displaced from the plane of the circular edge, comprising,
   a. a pair of generally cylindrical support rollers rotatably mounted at one end in cantilever fashion in generally horizontal spaced side-by-side relationship with the space between the rollers less than the radius of the discs to provide a cradle for supporting the discs on edge,
   b. means for rotating the rollers in the same angular direction so that adjacent surfaces of the rollers move in opposite directions to advance the discs along the rollers from said one end to the other,
   c. means for advancing a row of discs to the cradle at said one end of the rollers,
   d. holddown means disposed over the cradle to hold the discs against the rollers, and
   e. the advancing means comprises a tubular guide extending toward said one end of the rollers, a pair of feed rollers disposed at opposite sides of the guide and having surfaces engaging opposite sides of the discs, and means for rotating the feed rollers in a direction to advance the discs along the guide.

2. A feeding mechanism as defined in claim 1, wherein the holddown means comprises an elongated holddown rod extending longitudinally over the cradle.

3. A feeding mechanism for feeding a row of similar discs on edge in parallel relationship wherein each disc has a circular peripheral edge and a center of gravity displaced from the plane of the circular edge, comprising,
   a. a pair of generally cylindrical support rollers rotatably mounted at one end in cantilever fashion in generally horizontal spaced side-by-die relationship with the space between the rollers less than the radius of the discs to provide a cradle for supporting the discs on edge.
   b. means for rotating the rollers in the same angular direction so that adjacent surfaces of the rollers move in opposite directions to advance the discs along the rollers from said one end to the other,
   c. means for advancing a row of discs to the cradle at said one end of the rollers,
   d. holddown means disposed over the cradle to hold the discs against the rollers, and
   e. a yieldably mounted pressure roller engaging the discs at the discharge end of the support rollers and having an enlarged peripheral flange which momentrily retards discharge of the end disc until the force of the advancing means against discs causes the pressure roller to yield to discharge the end disc.

* * * * *